US008744265B2

(12) United States Patent
Effenberger (10) Patent No.: US 8,744,265 B2
(45) Date of Patent: Jun. 3, 2014

(54) PASSIVE OPTICAL NETWORK WITH PARTIALLY-TUNED LASERS (75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 2059 days.

(21) Appl. No.: 11/740,993

(22) Filed: Apr. 27, 2007

(65) Prior Publication Data
US 2008/0267627 A1 Oct. 30, 2008

(51) Int. Cl.
*H04J 4/00* (2006.01)
*H04J 14/00* (2006.01)

(52) U.S. Cl.
USPC ............ 398/75; 398/14; 398/34; 398/35; 398/72; 398/74; 398/79; 398/98; 398/196

(58) Field of Classification Search
USPC ......... 398/14, 25–36, 66–102, 151, 156, 159, 398/161, 162, 168
See application file for complete search history.

(56) References Cited

U.S. PATENT DOCUMENTS

| 5,589,970 | A * | 12/1996 | Lyu et al. ............ 398/95 |
| 5,920,414 | A * | 7/1999 | Miyachi et al. ........ 398/14 |
| 6,421,151 | B1 * | 7/2002 | Berger et al. .......... 398/79 |
| 6,567,198 | B1 | 5/2003 | Kang |
| 6,980,742 | B1 * | 12/2005 | Liden et al. ........... 398/85 |
| 6,980,743 | B1 * | 12/2005 | Greene ............... 398/92 |
| 7,079,715 | B2 * | 7/2006 | Kish et al. ............ 385/14 |
| 2003/0218759 | A1 | 11/2003 | Lee et al. |
| 2004/0114149 | A1 * | 6/2004 | Einstein et al. ......... 356/484 |
| 2005/0123300 | A1 * | 6/2005 | Kim et al. ............. 398/84 |
| 2005/0265725 | A1 * | 12/2005 | Okano et al. .......... 398/147 |
| 2006/0002706 | A1 * | 1/2006 | Lee et al. ............. 398/71 |
| 2006/0013588 | A1 * | 1/2006 | Lautenschlager ......... 398/85 |
| 2006/0120724 | A1 | 6/2006 | Ishimura |

FOREIGN PATENT DOCUMENTS

| CN | 1252654 A | 5/2000 |
| CN | 1722649 A | 1/2006 |
| CN | 1725721 A | 1/2006 |
| EP | 0981213 A1 | 2/2000 |

(Continued)

OTHER PUBLICATIONS

Foreign Communication From a Related Counterpart Application—International Search Report and Written Opinion, PCT/CN2007/071353, Mar. 27, 2008, 10 pages.

(Continued)

*Primary Examiner* — Li Liu
(74) *Attorney, Agent, or Firm* — Conley Rose, P.C.; Grant Rodolph (57) ABSTRACT

A passive optical network (PON) component comprising a processor coupled to a plurality of receivers, the processor configured to monitor a plurality of drifting laser wavelengths and cause the drifting laser wavelengths to be tuned to a plurality of pass-bands. Also disclosed is an optical network unit (ONU) comprising a receiver, a transmitter coupled to the receiver, and a partially-tunable laser coupled to the transmitter and having a drifting laser wavelength, wherein the drifting laser wavelength is periodically tuned to one of a plurality of pass-bands. Included is a method comprising monitoring a plurality of drifting laser wavelengths associated with a plurality of pass-bands, and reconfiguring a plurality of time division multiple access (TDMA) timeslots when one of the drifting laser wavelengths migrates from one pass-band to another pass-band.

19 Claims, 4 Drawing Sheets

(56) References Cited

FOREIGN PATENT DOCUMENTS

| EP | 1617532 A2 | 1/2006 |
|---|---|---|
| EP | 1855396 A1 | 11/2007 |
| WO | 2006089453 A1 | 8/2006 |

OTHER PUBLICATIONS

Foreign communication from a counterpart application, European application 07845179.5, Extended European Search Report dated Mar. 25, 2010, 6 pages.

Foreign Communication From a Related Counterpart Application, Chinese Application No. 200780000683.9, Chinese Office Action dated Nov. 5, 2012, 9 pages.

Foreign Communication From a Related Counterpart Application, Chinese Application No. 200780000683.9, Partial English Translation of Chinese Office Action dated Nov. 5, 2012, 6 pages.

Foreign Communication From a Related Counterpart Application, Chinese Application 200780000683.9, Chinese Office Action dated Mar. 24, 2011, 7 pages.

Foreign Communication From a Related Counterpart Application, Chinese Application 200780000683.9, Partial Translation of Chinese Office Action dated Mar. 24, 2011, 6 pages.

Foreign Communication From a Related Counterpart Application, Chinese Application 200780000683.9, Chinese Office Action dated Mar. 26, 2012, 8 pages.

Foreign Communication From a Related Counterpart Application, Chinese Application 200780000683.9, Partial Translation of Chinese Office Action dated Mar. 26, 2012, 9 pages.

Foreign Communication From a Related Counterpart Application, European Application 07846179.5, European Office Action dated Jun. 12, 2012, 5 pages.

* cited by examiner

PASSIVE OPTICAL NETWORK WITH PARTIALLY-TUNED LASERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. Downstream data transmissions may be broadcast to all of the ONTs, while upstream data transmissions may be transmitted to the OLT using time division multiple access (TDMA). TDMA ensures transmissions from the ONUs are received by the OLT one at a time and do not conflict with one another.

Because the per-user capacity of TDMA-based PONs is inversely proportional to the quantity of users, there is considerable interest in wavelength division multiple access (WDMA)-based PONs. WDMA-based PONs permit greater speeds by virtue of the numerous available wavelengths, but employ components which are undesirably expensive. Specifically, the lasers used in WDMA-based PONs must be fully-tunable in that they must be able to maintain a specific wavelength. Fully-tunable lasers require a complicated temperature control apparatus, and consequently are expensive and difficult to manufacture and operate. Thus, a need exists for a WDMA-based PON that does not require fully-tunable lasers.

SUMMARY

In one embodiment, the disclosure includes a passive optical network (PON) component comprising a processor coupled to a plurality of receivers, the processor configured to monitor a plurality of drifting laser wavelengths and cause the drifting laser wavelengths to be tuned to a plurality of pass-bands.

In another embodiment, the disclosure includes an optical network unit (ONU) comprising a receiver, a transmitter coupled to the receiver, and a partially-tunable laser coupled to the transmitter and having a drifting laser wavelength, wherein the drifting laser wavelength is periodically tuned to one of a plurality of pass-bands.

In a third embodiment, the disclosure includes a method comprising monitoring a plurality of drifting laser wavelengths associated with a plurality of pass-bands, and reconfiguring a plurality of time division multiple access (TDMA) timeslots when one of the drifting laser wavelengths migrates from one pass-band to another pass-band.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a passive optical network (PON) configuration having a plurality of optical network units (ONUs) containing partially-tunable lasers rather than fully-tunable lasers. The PON configuration may include an optical line terminal (OLT) that monitors the laser wavelength from each ONU and provides a tuning control signal. The tuning control signal approximately centers the laser wavelength onto one of a plurality of pass-bands. The pass-bands are associated with various upstream communication channels, and more than one pass-band can correspond to each upstream channel. When the laser wavelength in one of the ONUs drifts, the tuning control signal directs the ONU to migrate from one pass-band to another pass-band, which changes the upstream channel with which the ONU is associated. If multiple ONUs are assigned to the same channel, the OLT can configure or reconfigure time-division multiple access (TDMA) settings to enable multiple ONUs to share a single channel without conflicts.

Figure 1:
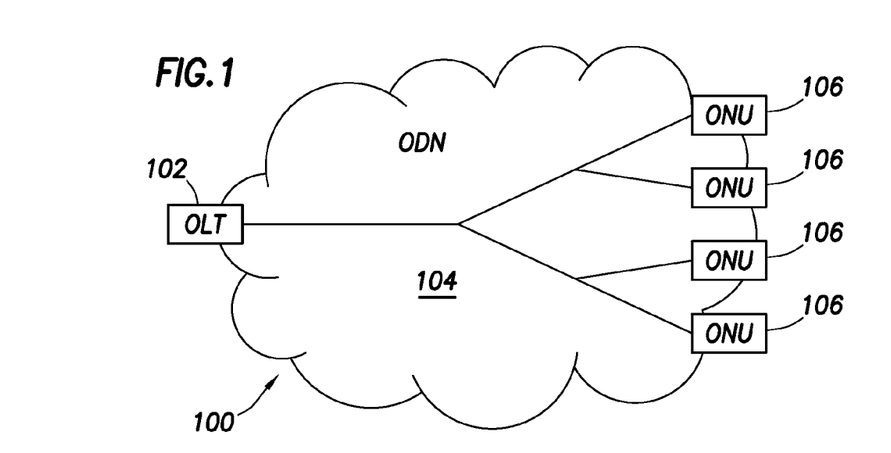
FIG. 1 illustrates a PON system in accordance with embodiments of the disclosure.

FIG. 1 illustrates one embodiment of a PON 100. The PON 100 comprises an OLT 102, an optical distribution network (ODN) 104, and a plurality of ONUs 106. The PON 100 is a communications network that does not require any active components to distribute data between the OLT 102 and the ONUs 106. Instead, the PON 100 uses the passive optical components in the ODN 104 to distribute data between the OLT 102 and the ONUs 106. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 102. The OLT 102 may be any device that is configured to communicate with the ONUs 106 and another network (not shown). Specifically, the OLT 102 may act as an intermediary between the other network and the ONUs 106 in that the OLT 102 forwards data received from the network to the ONUs 106, and forwards data received from the ONUs 106 onto the other network. Although the specific configuration of the OLT 102 may vary depending on the type of PON 100, in an embodiment the OLT 102 comprises a transmitter and a plurality of receivers, as explained in detail below. If the other network is using a protocol, such as Ethernet or SONET/SDH, that is different from the communications protocol used in the PON 100, then the OLT 102 may also comprise a converter that converts the other network's data into the PON's protocol and converts the PON's data into the other network's protocol. The OLT 102 described herein is typically located at a central location, such as a central office, but may be located at other locations as well.

Another component of the PON 100 may be the ONUs 106. The ONUs 106 may be any devices that are configured to communicate with the OLT 102 and a customer or user (not shown). Specifically, the ONUs may act as an intermediary between the OLT 102 and the customer in that the ONUs 106 forward data received from the OLT 102 to the customer, and forward data received from the customer onto the OLT 102. Although the specific configuration of the ONUs 106 may vary depending on the type of PON 100, in an embodiment the ONUs 106 may comprise an optical transmitter configured to send optical signals to the OLT 102, an optical receiver configured to receive optical signals from the OLT 102, and a converter that converts the optical signal into electrical signals for the customer, such as signals in the ATM or Ethernet protocol. The ONUs 106 may also comprise a second transmitter and/or receiver that sends and/or receives the electrical signals to a customer device. In some embodiments, ONUs 106 and optical network terminals (ONTs) are similar, and thus the terms are used interchangeably herein. The ONUs are typically provided at distributed locations, such as the customer premises, but may also be located elsewhere.

Another component of the PON 100 may be the ODN 104. The ODN 104 is a data distribution system comprised of optical fiber cables, couplers, splitters, distributors, and/or other equipment known to persons of ordinary skill in the art. In an embodiment, the optical fiber cables, couplers, splitters, distributors, and/or other equipment known to persons of ordinary skill in the art are passive optical components. Specifically, the optical fiber cables, couplers, splitters, distributors, and/or other equipment known to persons of ordinary skill in the art may be components that do not require any power to distribute data signals between the OLT 102 and the ONUs 106. The ODN 104 typically extends from the OLT 102 to the ONUs 106 in a branching configuration as shown in FIG. 1, but may be alternatively configured as determined by a person of ordinary skill in the art.

Figure 2:
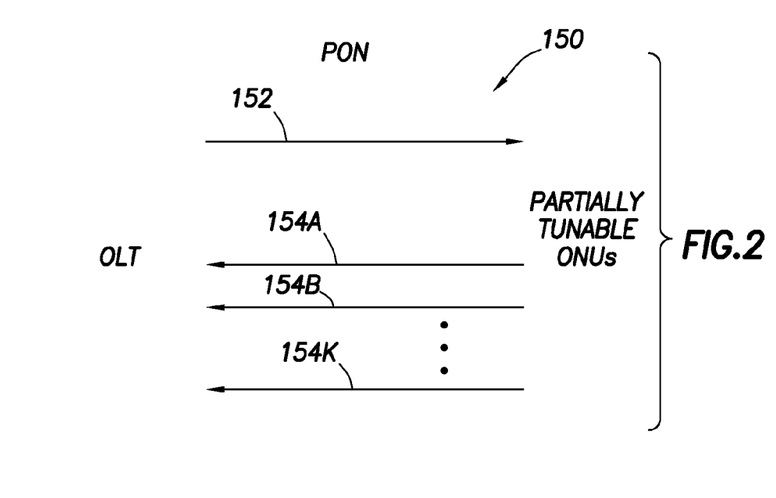
FIG. 2 illustrates channels in a PON system in accordance with embodiments of the disclosure.

FIG. 2 illustrates one embodiment of the channels in a PON 150. Specifically, the PON 150 may include a single downstream channel 152 and a plurality of upstream channels 154A-154K between the OLT and the ONUs. The downstream channel 152 allows the OLT to transmit tuning control signals and other data to the ONUs. As explained below, the tuning control signals may be used to approximately center the laser wavelengths onto one or more pass-bands associated with the upstream channels 154A-154K. The ONU laser wavelengths have the tendency to drift away from the centers of the pass-bands, and thus the lasers are periodically tuned to account for any laser wavelength drifting. Because the tuning function is limited, the OLT can selectively direct ONU laser wavelengths to migrate from one pass-band to another when the lasers can no longer be tuned to the center of its pass-band.

Some PON systems contain fully-tunable lasers. The term "fully-tunable laser" is intended to mean a laser that is controlled such that the laser wavelength may be set and maintained at a desired value. The wavelengths of any type of laser are affected by multiple factors, including but not limited to, operating temperature, laser current, laser voltage, oscillation source, and electrical noise. The operating temperature is affected by parameters such as the amount of laser current, the environment around the laser, dynamic cooling and heating components, the switching frequency of the laser, and the amount of laser activity or inactivity. Fully-tunable lasers sufficiently control these factors to maintain the laser wavelength at a desired value. Because temperature has such a large influence on the laser's wavelength, a fully-tunable laser generally has to control the laser temperature to maintain the laser wavelength at a desired value. Thus, a fully-tunable laser may contain frequency and phase lock control circuitry for an oscillation source, dynamic heating components, dynamic cooling components such as Peltier cooling elements, a laser current control component, a laser voltage control component, and noise filtering. Consequently, fully-tunable lasers tend to be an expensive and low-yield product in that the failure rate of the laser during manufacture is undesirably high.

At least some of the ONUs described herein may contain partially-tunable lasers. The term "partially-tunable laser" may refer to a laser having a limited tuning range for its wavelength, wherein the tuning range may be insufficient to maintain the laser at a single wavelength under different operating conditions. While the wavelength of the partially-tunable laser is affected by the same factors as the fully-tunable laser, fewer of the factors are controlled in the partially-tunable laser. For example, a partially-tunable laser may control only laser current and/or voltage, without controlling the laser temperature. Generally, the controlled factors do not fully compensate for the non-controlled factors, and the laser wavelength drifts. Rather than prevent the laser wavelength from drifting, the drifting laser wavelength may be monitored and the controlled factors periodically adjusted to approximately center each ONU laser wavelength to one of a plurality of the pass-bands. If needed, each ONU laser wavelength can be tuned such that it migrates from one pass-band to another. In other words, while the tuning range of the partially-tunable laser may be insufficient to maintain a desired wavelength, it is sufficient to maintain the laser's wavelength on one of the pass-bands, and consequently on one of the channels as described below. Consequently, partially-tunable lasers tend to be an inexpensive and high-yield product compared to fully-tunable lasers.

There are many types of partially-tunable lasers, and the components of these different lasers vary accordingly. By way of illustration and not limitation, distributed feedback (DFB) or distributed Bragg reflector (DBR) laser diodes could be used for partially-tunable lasers. DFB and DBR diodes may operate in a transverse or longitudinal single mode and feature a grating structure within the semiconductor material to narrow the emission line width. A partially-tunable laser could employ a DFB or DBR diode and tune the laser wavelength by controlling, for example, laser current or voltage, but not other parameters. In a specific embodiment, the partially-tunable laser would not employ dynamic cooling and heating components sufficient to maintain the laser wavelength at a predetermined value. Consequently, the laser wavelength drifts as the operating temperature changes. For small temperature changes, the partially-tuned laser current and/or voltage can be adjusted to attempt to maintain a desired laser wavelength. However, as the laser temperature begins to change, the laser wavelength will drift beyond the limited tuning range, and the ONU will not be able to maintain a laser wavelength within a predetermined pass-band. In such a case, the OLT may instruct the ONU to migrate to another pass-band within the tuning range of the partially-tunable laser.

The tuning range for a partially-tunable laser may depend on many factors. Some fully-tunable lasers can be maintained at any wavelength value over several hundred nanometers. In contrast, the tuning range of the partially-tunable lasers may be limited to a few nanometers. In one embodiment, the tuning range of the partially-tunable laser may be about equal to or just greater than, e.g. about 1.5 times, the gap between pass-bands. Such an embodiment is useful because the tuning control mechanism at the ONUs can be relatively simple, e.g. merely a current controller. For example, if the PON system uses pass-bands that are two nanometers (nm) wide and gaps that are one nm wide, then a partially-tunable laser may have a tuning range of up to about 1, about 1.5, or about 2 nm to ensure a laser wavelength can be shifted from the gap to either of the nearby pass-bands. In another embodiment, the tuning range of the partially-tunable laser may be about equal to or just greater than, e.g. about 1.5 times, the distance between the centers of the pass-bands. In such a case, if the laser wavelength can no longer be centered on one pass-band, the partially-tunable laser can adjust the laser wavelength to approximately the center of an adjacent pass-band. For example, if the PON system uses pass-bands that are four nm wide and gaps that are three nm wide, then a partially-tunable laser may have a tuning range of up to about 5, about 7 or about 10 nm to ensure a laser wavelength can be shifted from the gap to approximately the center of either of the nearby pass-bands. In an alternative embodiment, the tuning range may be much greater than the gap between pass-bands, e.g. about 2-10 times greater. Increased tuning ranges may be beneficial in that they help reduce the amount of pass-band migration by the ONU, or by more evenly distributing ONUs to available pass-bands.

Figure 3:
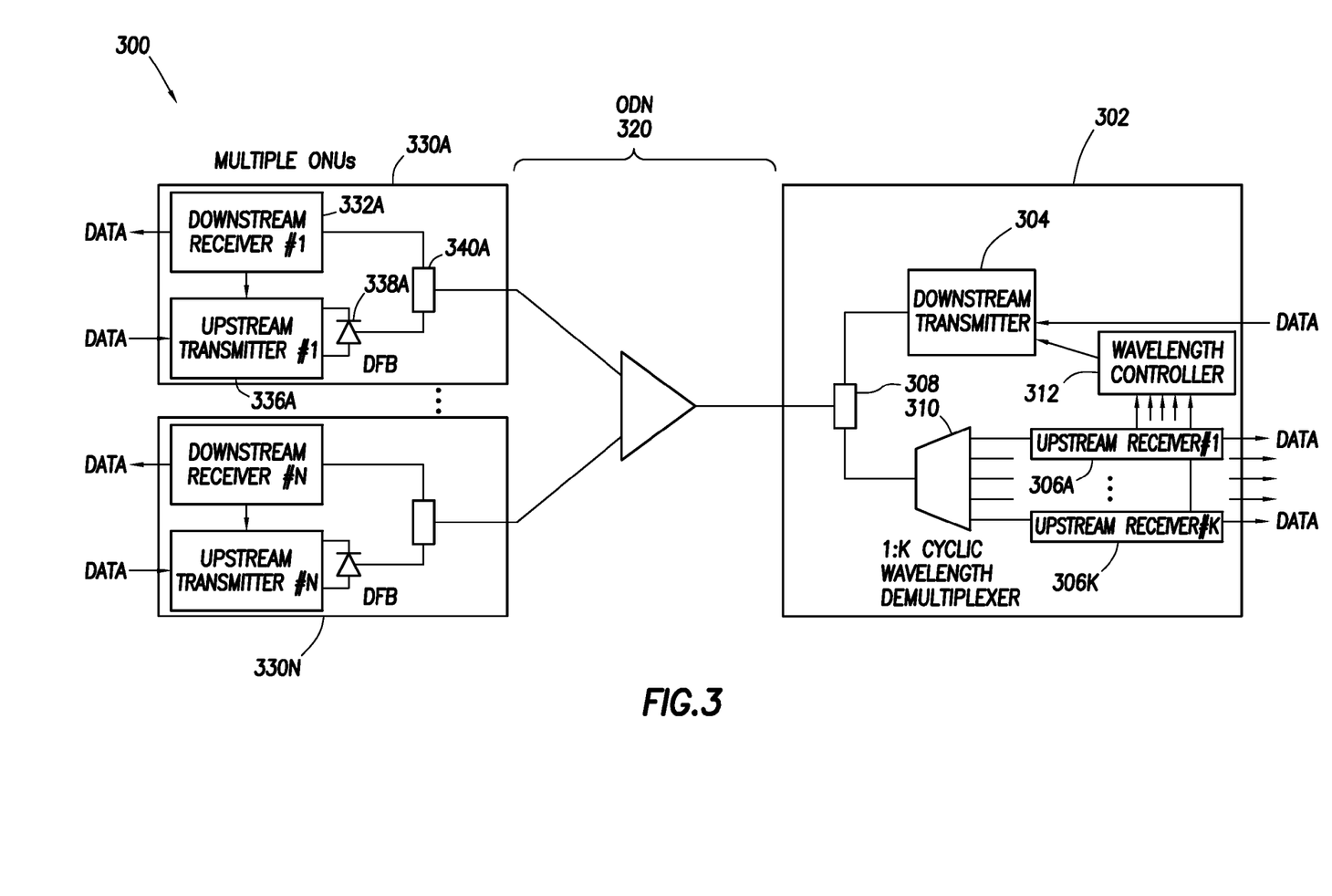
FIG. 3 illustrates a PON system in accordance with embodiments of the disclosure.

FIG. 3 illustrates a PON system 300 in accordance with embodiments of the disclosure. As shown, the system 300 comprises an OLT 302 that couples to a plurality of ONUs 330A-330N. ONUs 330A-330N may be substantially the same and thus only ONU 330A will be described herein. ONU 330A comprises a downstream receiver 332A coupled to an upstream transmitter 336A. Both the downstream receiver 332A and the upstream transmitter 336A are coupled to a diplexer 340A that separates downstream communications from upstream communications in the ONU 330A. The downstream receiver 332A is able to receive tuning commands and TDMA settings from the OLT 302, and provide the tuning commands and TDMA settings to the upstream transmitter 336A. In response, the upstream transmitter 336A controls a laser 338A, such as a DFB or DBR laser, based on the tuning commands and TDMA settings. Specifically, the tuning command causes the laser wavelength to be centered on a particular pass-band of an upstream channel and the TDMA settings cause the laser wavelength to be timed to avoid conflicts with other ONUs that share the same pass-band or upstream channel. In some embodiments, the tuning commands control the laser current without substantially affecting the operating temperature variations of the laser 338A.

The laser wavelength is provided to the diplexer 340A that transmits to the OLT 302 via the ODN 320. The ODN 320 may comprise passive elements such as optical fiber cables, couplers, splitters, distributors, and/or other equipment. The OLT 302 receives transmissions from the ONUs 330A-330N via a diplexer 308, which separates downstream communications from upstream communications in the OLT 302. Upstream communications are forwarded to a cyclic wavelength demultiplexer 310 that allocates or distributes the incoming signals into the communication channels and forwards the signals to a plurality of upstream receivers 306A-306K.

In an embodiment, the cyclic wavelength demultiplexer 310 implements an arrayed-waveguide grating (AWG) that distributes laser wavelengths from the N ONUs to the K upstream receivers 306A-306K. The cyclic wavelength demultiplexer 310 is wavelength selective in that only wavelengths that are integer multiples of a base wavelength ($\lambda_{base}$) are distributed to the upstream receivers 306A-306K. As an example, $\lambda_{base}$ may be four nm. In such case, the upstream receiver 306A may receive transmissions for n*4 nm, the upstream receiver 306B may receive transmissions for (n+1)*4 nm, the upstream receiver 306K may receive transmissions for (n+k−1) and so on in a cyclic pattern, where n and k are integers. If a transmission is received that is not an integer multiple of $\lambda_{base}$, the transmission would be filtered by the AWG. Persons of ordinary skill in the art will appreciate that while exact wavelengths are described herein, the cyclic wavelength demultiplexer 310 may also divide the wavelengths into groups consisting of a plurality or ranges of wavelengths.

The pass-bands system 300 corresponds to the wavelengths accepted by the AWG. For example, if the $\lambda_{base}$ of the AWG is four nm, a first pass-band can be designated for the PON system 300 as n*4 nm, a second pass-band can be designated for the PON system 300 as (n+1)*4 nm and so on in a cyclic pattern. As such, multiple pass-bands may be associated with each of the upstream receivers 306A-306K such that each of the upstream receivers 306A-306K is potentially responsible for processing communications for a plurality of laser wavelengths. As an example, upstream receiver 306A could handle communications for the laser wavelengths n*$\lambda_{base}$, (n+k)*$\lambda_{base}$, (n+2 k)*$\lambda_{base}$ and so on. The cyclic nature of the demultiplexer 310 ensures that all ONU transmissions are either allocated to an upstream receiver 306A-306K or filtered.

Because the ONU laser wavelengths have the tendency to drift, monitoring and adjusting ONU laser wavelengths is needed to ensure valid ONU communications are not filtered by the AWG of the demultiplexer 310. For example, a communication may be filtered if an ONU laser wavelength falls in a gap between the pass-bands. Thus, in at least some embodiments, a wavelength controller 312 or other logic couples to the upstream receivers 306A-306K and monitors the wavelength of ONU transmissions received by the upstream receivers 306A-306K. As an example, a given ONU may dither its wavelength according to a fixed schedule while the OLT 302 records the power variations that occur on the fixed schedule. The OLT 302 then transmits the results to the given ONU. After a few trial and error periods, the laser behavior would be determined and the given ONU begins to operate at maximum transmission power.

Based on the monitored information, the wavelength controller 312 provides tuning control signals to the ONUs 330A-330N. The tuning control signals enable each ONU to adjust its laser wavelength, as necessary, to within the limits of the pass-bands. In an embodiment, the laser wavelength is tuned to the approximate center of one of the pass-bands corresponding to the upstream channels. In some cases, the tuning control signals cause the ONUs to migrate from one pass-band to another as the laser wavelengths drift. In at least some embodiments, the wavelength controller 312 reduces or minimizes migration from one pass-band to another. For example, the wavelength controller 312 may tune each ONU laser wavelength to a given pass-band until a maximum tuning capacity threshold is reached. Thereafter, the wavelength controller selects a new pass-band. The new pass-band may have a position that enables an ONU laser wavelength to be centered on the new pass-band with minimal amounts of tuning. Alternatively, the wavelength controller 312 selects another pass-band within the tuning range of the partially-tunable laser. As an example, the wavelength controller 312 could reduce or minimize migration by monitoring the drifting behavior of a partially-tuned laser and determining the direction or pattern of laser wavelength drifting. The wavelength controller 312 could then use the drift direction or drift pattern information to select a new pass-band that reduce or minimizes future migration even if laser tuning is not immediately reduced or minimized.

The wavelength controller 312 or other logic also may monitor the quantity of ONUs allocated to each of the pass-bands or upstream channels and the corresponding upstream receivers 306A-306K. Based on the monitored information, the wavelength controller 312 may configure or reconfigure the TDMA settings of the ONUs. The TDMA settings enable multiple ONUs to share a single wavelength by separating transmissions in the time domain. In some embodiments, the wavelength controller 312 may also attempt to allocate ONUs evenly between the limited number of upstream channels. For example, if there are N ONUs and K upstream receivers, where N is greater than K, then the wavelength controller 312 may provide tuning control signals that attempt to allocate the N ONUs evenly between the K upstream receivers. In some cases, the tuning control signals only attempt to reallocate ONUs if the number of ONUs allocated to a single upstream channel is greater than a threshold amount. Otherwise, the wavelength controller 312 may simply provide tuning control signals that reduce or minimize the amount of tuning or the amount of migration. That is, the ONUs may be tuned to the nearest pass-band corresponding to an upstream receiver regardless of the amount of ONUs allocated to each channel.

The ONUs 330A-330N and the OLT 302 may also comprise Media Access Control (MAC) logic (not shown). For example, MAC logic at the ONU 330A could enable at least one device, such as a customer computer or multimedia device, to interface with the downstream receiver 332A and the upstream transmitter 336A of the ONU 330A. Also, MAC logic at the OLT 302 could enable network devices to interface with the downstream transmitter 304 and the upstream receivers 306A-306K of the OLT 302. In this manner, a customer computer or multimedia device is able to communicate with network devices via the PON system 300.

Figure 4:
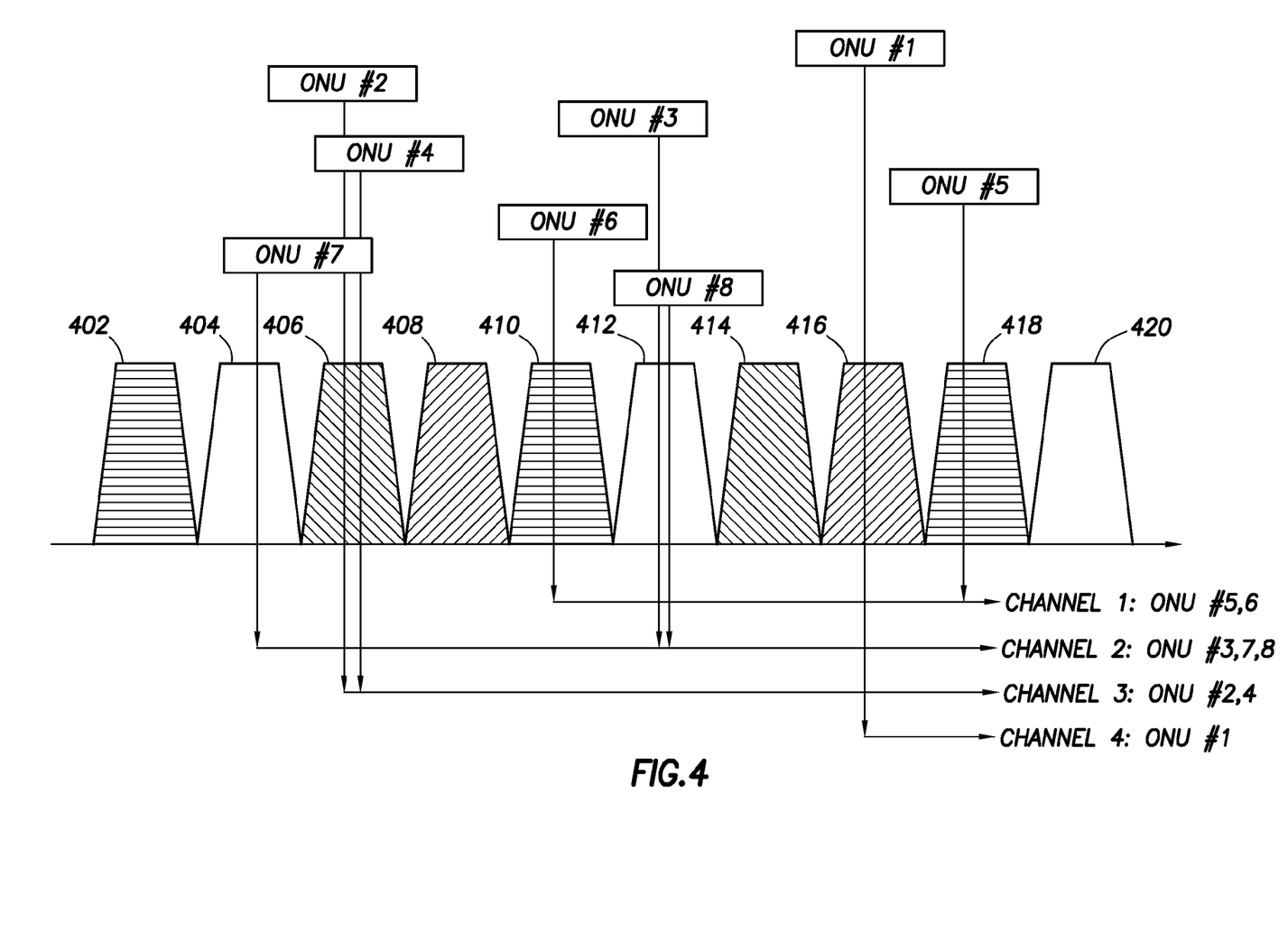
FIG. 4 illustrates a wavelength arrangement for a PON system in accordance with embodiments of the disclosure.

FIG. 4 illustrates a pass-band arrangement 400 for a PON system in accordance with embodiments of the disclosure. As shown, the wavelength arrangement 400 comprises a plurality of pass-bands 402, 404, 406, 408, 410, 412, 414, 416, 418, and 420. The pass-bands 402, 404, 406, 408, 410, 412, 414, 416, 418, and 420 are arranged in order of increasing wavelength, thus pass-bands to the left of the pass-band 402 or to the right of the pass-band 420 could exist as well. The center of each pass-band may correspond to an integer multiple of some $\lambda_{base}$ related to the AWG discussed herein. As an example, the center of the pass-band 402 may correspond to $n*\lambda_{base}$, the center of the pass-band 404 may correspond to $(n+1)*\lambda_{base}$, the center of the pass-band 406 may correspond to $(n+2)*\lambda_{base}$ and so on.

In FIG. 4, the use of a cyclic wavelength demultiplexer with a four-channel repeating pattern is represented by shading the pass-bands. Specifically, pass-bands 402, 410 and 418 are shaded the same and correspond to a communication channel "1", pass-bands 404, 412 and 420 are shaded the same and correspond to a communication channel "2", pass-bands 406 and 414 are shaded the same and correspond to a communication channel "3", and pass-bands 408 and 416 are shaded the same and correspond to a communication channel "4".

As shown in FIG. 4, several ONUs (numbered 1-8) are represented as having their lasers tuned to a particular pass-band. Specifically, ONU 1 is tuned to pass-band 416, ONUs 2 and 4 are tuned to pass-band 406, ONUs 3 and 8 are tuned to pass-band 412, ONU 5 is tuned to pass-band 418, ONU 6 is tuned to pass-band 410, and ONU 7 is tuned to pass-band 404. The tuning of these ONUs to the different pass-bands may change as their respective lasers drift. If multiple ONUs are allocated to a single pass-band or communication channel, as is the case for communication channels 1-3, then TDMA settings can be configured or reconfigured to prevent conflicts between ONU communications. For example, if ONU 7 drifts from pass-band 404 to pass-band 406, then the TDMA settings for channels 2 and 3 may be reconfigured to accommodate the addition or loss of ONU 7. Persons of ordinary skill in the art are aware of how to reconfigure TDMA channels when an ONU is added to or removed from a channel.

In at least some embodiments, the allocation of ONUs to pass bands may be organized to improve system performance. Specifically, even though FIG. 4 shows several different pass-bands (10 pass-bands) for a representative PON, each ONU is not randomly allocated to these pass-bands. Rather, ONU laser wavelengths are shifted to a nearby pass-band resulting in the ONU distribution shown in FIG. 4. Over time, the ONU distribution could change depending on how much each ONU laser wavelength drifts. In at least some embodiments, migration from one of the pass-bands to another is permitted, but is reduced or minimized, for example, by tuning the ONU laser wavelengths to the same pass-band until a maximum tuning capacity threshold is reached. To compensate for laser wavelength drifting, laser current or some other control factor could be used to shift the laser wavelength for each ONU forward or backward to the approximate center of a nearby pass-band. Tuning to a pass-band that is not adjacent may also be possible and could be performed to reduce or minimize migration. The selection of a new pass-band could be based on a drift direction or drift pattern calculation.

Figure 5:
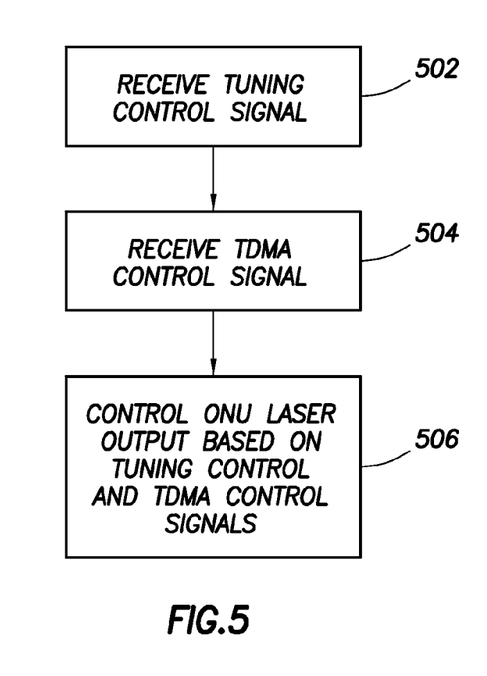
FIG. 5 illustrates a method in accordance with embodiments of the disclosure.

FIG. 5 illustrates an ONU tuning and transmission method 500 in accordance with embodiments of the disclosure. The method 500 could be periodically performed by each ONU of a PON system to compensate for laser wavelength drifting and to prevent conflicts between ONUs that share a single pass-band or communication channel. At block 502, the method 500 comprises receiving a tuning control signal. The tuning control signal enables a laser wavelength to be increased or decreased by a limited amount. For example, the tuning control signal could enable the laser wavelength to be approximately centered on a pass-band. Although other control factors are possible, some embodiments tune an ONU laser by changing the laser current and/or voltage without substantially controlling operating temperature variations. At block 504, a TDMA control signal is received. The TDMA control signal enables a laser wavelength to be timed to prevent conflicts when multiple PONs share a single pass-band or communication channel. At block 506, an ONU laser is controlled based on the tuning control signal and the TDMA control signal.

Figure 6:
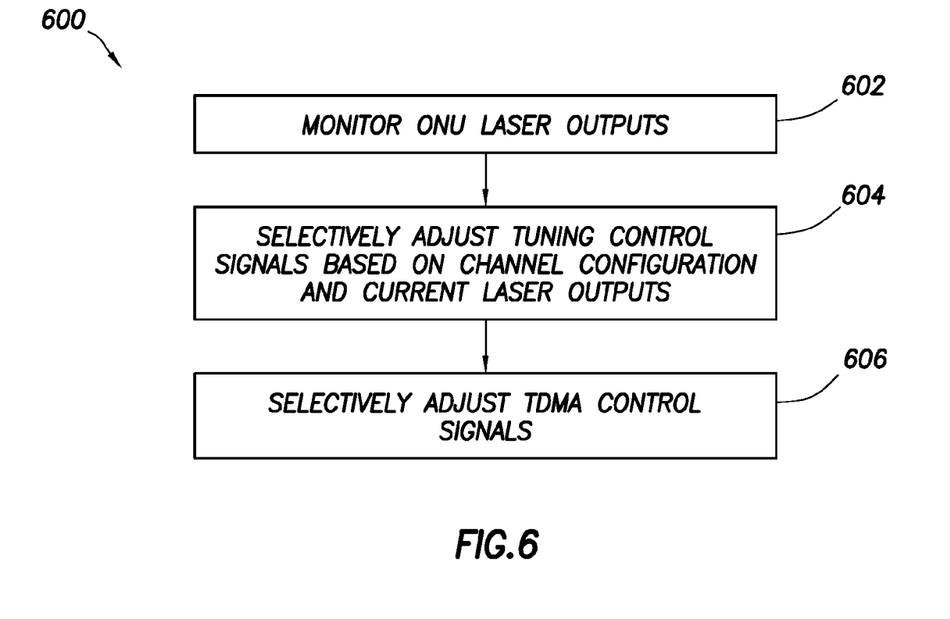
FIG. 6 illustrates another method in accordance with embodiments of the disclosure.

FIG. 6 illustrates an OLT monitoring and tuning method 600 in accordance with embodiments of the disclosure. The method 600 can be performed periodically by the OLT of a PON system to tune system ONUs to available pass-bands, and to prevent conflicts between ONUs that share a single pass-band or communication channel. At block 602, the method 600 comprises monitoring ONU laser wavelengths. At block 604, the method 600 further comprises selectively adjusting tuning control signals based on a channel configuration and current laser wavelengths. As an example, the tuning control signal could be based on identifying the center of a plurality of available pass-bands for the PON system and identifying how much shifting is needed to tune a laser to the center of one of the available pass-bands. The pass-band selected for tuning could be the pass-band nearest the current laser wavelength or another pass-band within the tuning range of the laser. In at least some embodiments, the tuning control signal affects laser current and/or voltage, but does not substantially affect operating temperature variations of a laser. At block 606, TDMA settings are selectively adjusted. For example, the TDMA setting could be adjusted as the number of ONUs allocated to each pass-band or communication channel changes.

Figure 7:
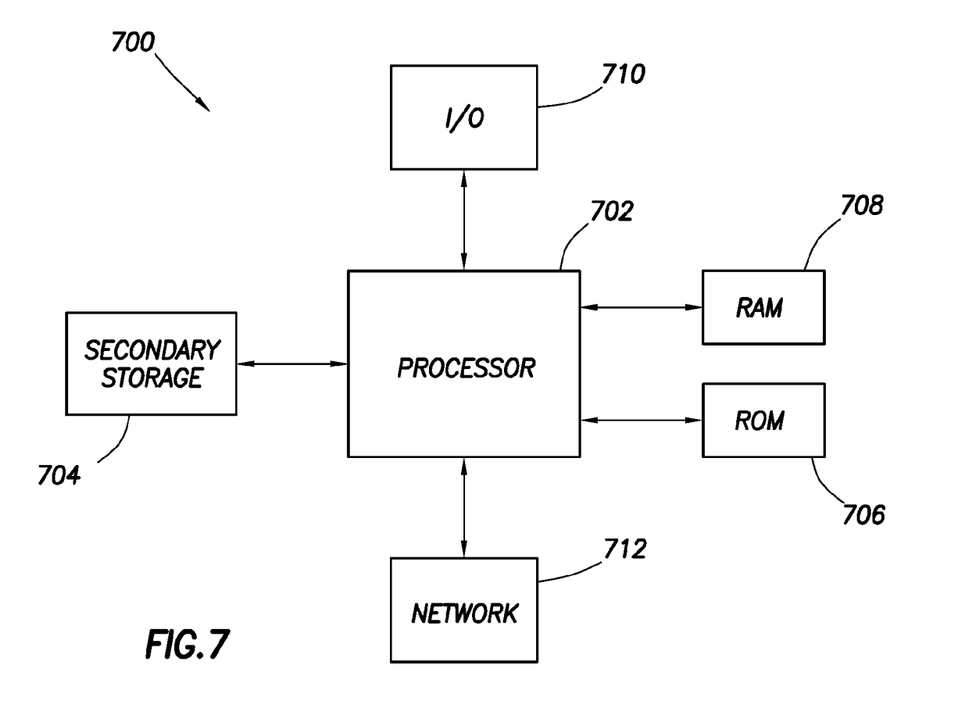
FIG. 7 illustrates an exemplary general-purpose computer system suitable for implementing the several embodiments of the disclosure.

The network described above may be implemented on any general-purpose network component, such as a computer or network component with sufficient processing power, memory resources, and network throughput capability to handle the necessary workload placed upon it. FIG. 7 illustrates a typical, general-purpose network component suitable for implementing one or more embodiments of a node disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) 710 devices, and network connectivity devices 712. The processor may be implemented as one or more CPU chips.

The secondary storage 704 is typically comprised of one or more disk drives or tape drives and is used for non-volatile storage of data and as an over-flow data storage device if RAM 608 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage. The RAM 708 is used to store volatile data and perhaps to store instructions. Access to both ROM 706 and RAM 708 is typically faster than to secondary storage 704.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A passive optical network (PON) component comprising:
    a processor coupled to a plurality of receivers, the processor configured to monitor a plurality of drifting laser wavelengths transmitted from a plurality of lasers, each of which is unable to transmit its wavelength within a single pass-band, and cause the drifting laser wavelengths to be tuned to a plurality of pass-bands.

2. The component of claim 1 further comprising a cyclic wavelength demultiplexer coupled to the receivers and configured to allocate the drifting laser wavelengths to the receivers.

3. The component of claim 1 wherein the processor monitors a quantity of drifting laser wavelengths allocated to each of the receivers.

4. The component of claim 1 wherein the processor causes at least one time-division multiple access (TDMA) setting to be configured when a plurality of the drifting laser wavelengths are allocated to one receiver, thereby preventing conflicts between the drifting laser wavelengths.

5. The component of claim 1 wherein the processor causes at least some of the drifting laser wavelengths to be tuned to an approximate center of the pass-bands.

6. The component of claim 5 wherein the processor centers a given drifting laser wavelength to a nearby pass-band until a tuning range is reached.

7. The component of claim 1 wherein the processor causes at least some of the drifting laser wavelength to be tuned such that the drifting laser wavelengths are distributed substantially evenly over the receivers.

8. The component of claim 1 wherein the processor causes one of the drifting laser wavelengths to be tuned such that migration between the pass-bands is reduced.

9. The component of claim 8 wherein the processor causes the migration to be reduced by determining a pattern of at least one drifting laser wavelength, and tuning the drifting laser wavelength to a pass-band that reduces migration based on the pattern.

10. An optical network unit (ONU) comprising:
    a receiver;
    a transmitter coupled to the receiver; and
    a partially-tunable laser coupled to the transmitter and having a drifting laser wavelength,
    wherein the drifting laser wavelength is periodically tuned to one of a plurality of pass-bands,
    wherein a timing of a transmission from the partially tunable laser is based on time-division multiple access (TDMA) settings that change due to the drifting laser wavelength.

11. The ONU of claim 10 wherein the laser lacks a temperature control component, and wherein a tuning range of the laser is insufficient to maintain the laser within a single pass-band over a temperature range in which the laser operates.

12. The ONU of claim 11 wherein the laser has a tuning range that is up to about twice of a gap between adjacent pass-bands.

13. The ONU of claim 10 wherein the laser comprises a distributed feedback (DFB) diode laser that is tunable based on a current or a voltage.

14. The ONU of claim 10 wherein the receiver receives tuning commands from an optical line terminal (OLT) and forwards the tuning commands to the transmitter.

15. A method comprising:
   monitoring a plurality of drifting laser wavelengths associated with a plurality of pass-bands; and
   reconfiguring a plurality of time division multiple access (TDMA) timeslots when one of the drifting laser wavelengths migrates from one pass-band to another pass-band.

16. The method of claim 15 further comprising providing control signals to tune a plurality of lasers associated with variable laser wavelengths.

17. The method of claim 15 further comprising:
   monitoring a pattern for each drifting laser wavelength; and
   tuning each drifting laser wavelength to a pass-band using the pattern, thereby reducing the migration between pass-bands.

18. The method of claim 15 further comprising tuning the lasers without using temperature control components.

19. The method of claim 15 further comprising receiving the variable laser wavelengths via a cyclic wavelength demultiplexer.

* * * * *